US012762690B2

(12) United States Patent
Ooishi

(10) Patent No.: US 12,762,690 B2
(45) Date of Patent: Oct. 13, 2026

(54) IMAGE FORMING APPARATUS AND IMAGE INSPECTION METHOD

(71) Applicant: Konica Minolta, Inc., Tokyo (JP)

(72) Inventor: Tatsuro Ooishi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 254 days.

(21) Appl. No.: 18/638,929

(22) Filed: Apr. 18, 2024

(65) Prior Publication Data

US 2024/0362768 A1 Oct. 31, 2024

(30) Foreign Application Priority Data

Apr. 26, 2023 (JP) ................................. 2023-072557

(51) Int. Cl.
*G06K 9/00* (2022.01)
*G03G 15/00* (2006.01)
*G06T 7/00* (2017.01)

(52) U.S. Cl.
CPC ....... *G06T 7/0008* (2013.01); *G03G 15/5054* (2013.01); *G03G 15/5062* (2013.01)

(58) Field of Classification Search
CPC . G06T 2207/30144; G06T 2207/30176; G06T 7/0004; G06T 7/0008; G06T 2207/10008; G03G 15/5054; G03G 15/5062
See application file for complete search history.

(56) References Cited

U.S. PATENT DOCUMENTS

| | | | | |
|---|---|---|---|---|
| 11,528,378 B2 * | 12/2022 | Hasegawa | .......... | H04N 1/00663 |
| 2018/0157446 A1 * | 6/2018 | Fukuda | .................. | G06K 15/16 |
| 2020/0391516 A1 * | 12/2020 | Date | ...................... | B41J 29/393 |
| 2022/0153016 A1 * | 5/2022 | Landa | .................... | B65H 29/04 |

FOREIGN PATENT DOCUMENTS

| | | |
|---|---|---|
| JP | 2004-043124 A | 2/2004 |
| JP | 2004-106999 A | 4/2004 |

* cited by examiner

*Primary Examiner* — Avinash Yentrapati
(74) *Attorney, Agent, or Firm* — LUCAS & MERCANTI, LLP

(57) ABSTRACT

According to an image forming apparatus, it is possible to sort a defective product without requiring time and effort of a user and without increasing or decreasing cost. The image forming apparatus includes: a sheet conveyer having a cylindrical shape that conveys a sheet; an image former that forms an image on the sheet conveyed by the sheet conveyer; an image reader that generates a read image of a printed product which is the sheet on which the image has been formed by the image former; and a hardware processor, in which the hardware processor inspects for presence or absence of a defect in the printed product based on the read image, and causes the printed product being inspected to rotate on an outer peripheral portion of the sheet conveyer without ejecting the printed product being inspected from the apparatus during start to end of inspection of the printed product.

9 Claims, 10 Drawing Sheets

IMAGE FORMING APPARATUS AND IMAGE INSPECTION METHOD

CROSS-REFERENCE TO RELATED APPLICATION

The entire disclosure of Japanese patent Application No. 2023-072557, filed on Apr. 26, 2023, is incorporated herein by reference in its entirety.

BACKGROUND OF THE INVENTION

1. Technical Field

The present invention relates to an image forming apparatus and an image inspection method.

2. Description of Related Art

Inspection of a printed product has conventionally been performed by analyzing a read image of the printed product read by an image reader of an in-line sensor provided in an image forming apparatus or the like. However, a path between an image reader installation position in the apparatus and a sheet ejection tray to which the printed product is ejected is often short. Consequently, the inspection may not be completed yet at the timing when the printed product is ejected from the image forming apparatus. In this case, although the inspection has not been completed, the printed product is ejected to a sheet ejection tray for quality products set as a predetermined sheet ejection point. That is, a printed product that is a defective product may be ejected to the sheet ejection tray for quality products, for example.

When the defective printed product is mixed into the sheet ejection tray for quality products, in a conventional manner, printing is stopped at the timing when the defective product is detected, and an error is displayed on a display or the like of the image forming apparatus. Accordingly, a user can find and remove the defective product mixed into the sheet ejection tray for quality products.

However, if the printing by the image forming apparatus is interrupted every time a defective product is detected, the productivity decreases. Further, in an apparatus that requires a long warm-up time, the decrease in the productivity becomes more significant.

In addition, in the image forming apparatus, together with creating a list of detected defective products, identifying each printed product by numbering on the printed products or the like enables the user to remove the defective products. However, in a case of a large number of printed sheets, it takes a long time for the user to search for a mark such as numbering to remove the defective products.

Therefore, a method capable of extracting the defective products without requiring time and effort of the user has been studied. For example, adding a device that can extend a path to the path from the image reader to the ejection tray (sheet conveyance path) enables completion of the inspection of the printed product before the printed product is ejected.

In addition, Japanese Unexamined Patent Publication No. 2004-043124 discloses a sheet inspection apparatus configured to convey a defective sheet detected according to information obtained by reading information on the conveyed sheet to an inspection tray, and convey a sheet conveyed subsequent to the defective sheet to a buffer tray.

Further, Japanese Unexamined Patent Publication No. 2004-106999 discloses a sheet inspection apparatus including a buffer tray, a refeeding means, and a central processing unit (CPU). The buffer tray temporarily holds a sheet guided on the conveyance path. The refeeding means feeds the sheet held in the buffer tray to the conveyance path again. The CPU controls a flapper for switching a conveyance direction according to a comparison result between information on the sheet related to image print and information on the sheet read by the reading device.

According to the technique described in Japanese Unexamined Patent Publication No. 2004-043124 or Japanese Unexamined Patent Publication No. 2004-106999, the printed product subsequent to the printed product determined as defective is temporarily ejected to the buffer tray, which can prevent the printed product that has not been inspected from being ejected to the sheet ejection tray.

SUMMARY OF THE INVENTION

However, in a case of adopting the technique of adding the device for extending the conveyance path, the technique described in Japanese Unexamined Patent Publication No. 2004-043124 or Japanese Unexamined Patent Publication No. 2004-106999, or the like, it is necessary to add the device, the buffer tray, or the like. In such a case, there is an issue of rising cost.

The present invention has been made in view of such circumstances, and an object of the present invention is to enable sorting of a defective product without requiring time and effort of a user and without increasing or decreasing cost.

In order to achieve at least one of the aforementioned objects, an image forming apparatus reflecting one aspect of the present invention includes: a sheet conveyer having a cylindrical shape that conveys a sheet; an image former that forms an image on the sheet conveyed by the sheet conveyer; an image reader that generates a read image of a printed product which is the sheet on which the image has been formed by the image former; and a hardware processor. The hardware processor inspects for presence or absence of a defect in the printed product based on the read image. In addition, the hardware processor causes the printed product being inspected to rotate on an outer peripheral portion of the sheet conveyer without ejecting the printed product being inspected from the apparatus during start to end of inspection of the printed product.

BRIEF DESCRIPTION OF THE DRAWINGS

The advantages and features provided by one or more embodiments of the invention will become more fully understand from the detailed description given hereinbelow and the appended drawings which are given by way of illustration only, and thus are not intended as a definition of the limits of the present invention.

DETAILED DESCRIPTION

Hereinafter, one or more embodiments of the present invention will be described with reference to the drawings. However, the scope of the invention is not limited to the disclosed embodiments.

In this specification and the drawings, constituent elements having substantially the same functions or configurations are denoted by the same reference signs, and redundant description of the constituent elements will be omitted.

<Configuration of Image Forming Apparatus>

First, an overall configuration of an image forming apparatus according to an embodiment of the present invention will be described with reference to FIG. 1.

Figure 1:
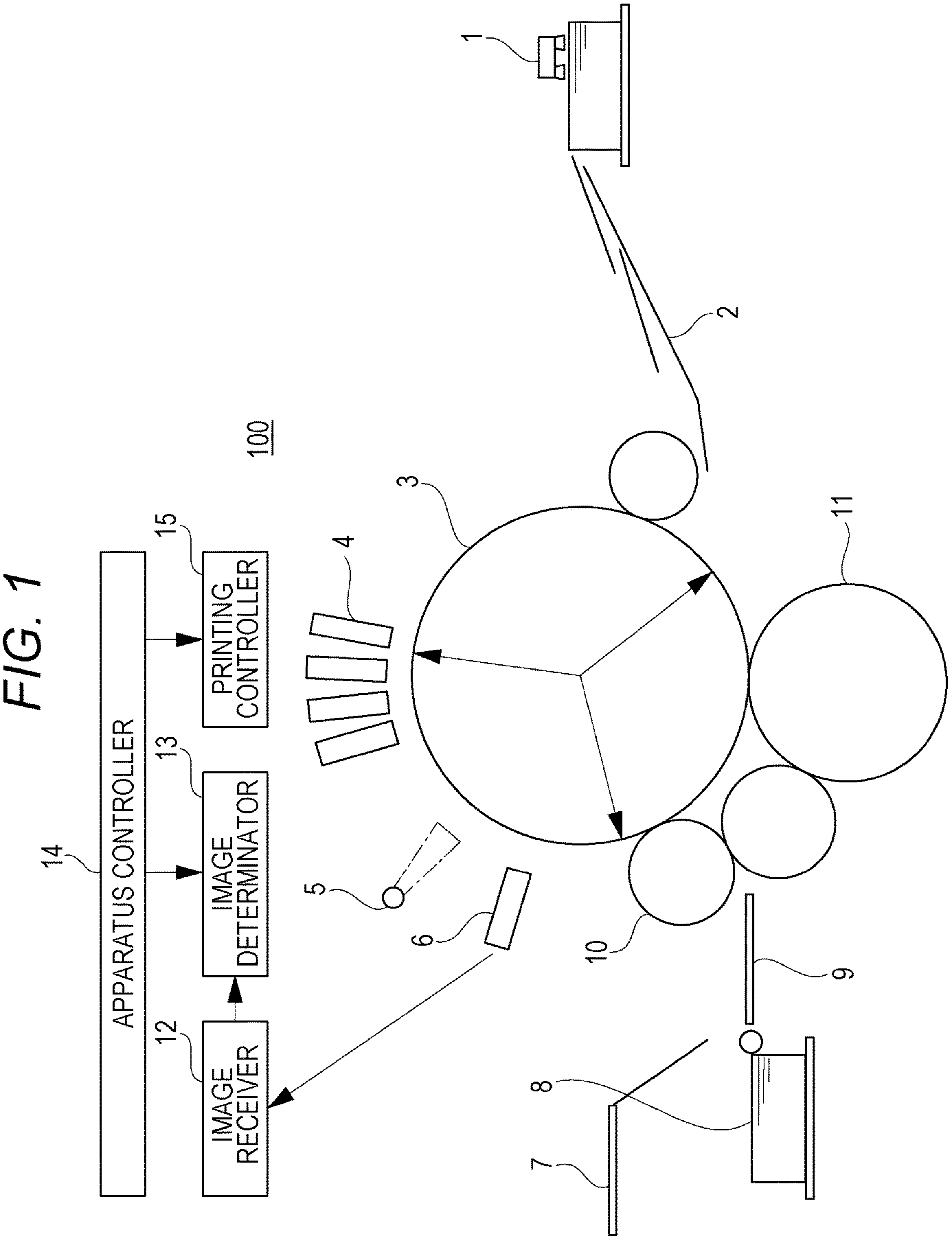
FIG. 1 is a schematic diagram illustrating an overall configuration of an image forming apparatus according to an embodiment of the present invention.

FIG. 1 is a schematic diagram illustrating the overall configuration of an image forming apparatus 100. Note that FIG. 1 illustrates elements and related elements thereof necessary for describing the present invention, and an image forming apparatus of the present invention is not limited to the example illustrated in FIG. 1.

The image forming apparatus 100 includes a sheet feed device 1, a sheet feed conveyer 2, a sheet conveyer 3, a printer 4, an ultraviolet (UV) lamp 5, and an image reader 6. In addition, the image forming apparatus 100 includes a defective product sheet ejector 7, a quality product sheet ejector 8, a sheet ejection point switcher 9, a conveyance point switcher 10, and a reverser 11. The image forming apparatus 100 further includes an image receiver 12, an image determinator 13, an apparatus controller 14, and a printing controller 15. Note that the image receiver 12, the image determinator 13, the apparatus controller 14, and the printing controller 15 are implemented by a hardware processor.

The sheet feed device 1 includes a plurality of sheet feed trays in which sheets (flat cut sheets) of various paper types and sheet sizes are stored, and feeds the sheets stored in the sheet feed trays to the sheet feed conveyer 2 of the image forming apparatus 100. The sheet feed conveyer 2 conveys the sheet fed from the sheet feed device 1 to the sheet conveyer 3. Note that the number of sheet feed trays is not limited to a plurality, and may be one.

The sheet conveyer 3 is formed of a cylindrical drum, and is rotationally driven by a drive motor (not illustrated), thereby rotating counterclockwise. Then, the drum rotates in a state where claws (not illustrated) provided on the surface of the sheet conveyer 3 grip the edge portion of the sheet, and thus the sheet is conveyed in a rotation direction of the drum (counterclockwise direction). Note that although the example in which the sheet conveyer 3 is formed of the cylindrical drum has been described in the present embodiment, the present invention is not limited thereto. The sheet conveyer may have any other shape, such as roller-like, belt-like, polygonal, or elliptical, as long as the sheet conveyer has a cylindrical shape allowing a sheet to rotate on its outer periphery.

The printer 4 (an example of an image former) ejects each of UV inks of Yellow (Y), Magenta (M), Cyan (C), and Black (K) from nozzles of heads (not illustrated) onto the surface of the sheet according to image data included in a print job input from a printer controller (not illustrated). Accordingly, an image is formed (printed) on the sheet. The UV ink is ink which is cured by irradiation with ultraviolet light.

Note that although the example in which the types of ink ejected from the heads are four colors of Y, M, C, and K has been described in the present embodiment, but the present invention is not limited thereto. The types of ink ejected from the heads may be three or less colors or five or more colors.

In addition, although the example in which the image forming apparatus of the present invention is applied to the image forming apparatus 100 with an inkjet method of forming an image on a sheet by ink ejection has been described in the present embodiment, the present invention is not limited thereto. The image forming method of the image forming apparatus of the present invention may be another method such as an electrophotographic method.

The UV lamp 5 is arranged at a position facing the outer peripheral surface of the sheet conveyer 3 on the downstream side of the printer 4 in the sheet conveyance direction. The UV lamp 5 irradiates the surface of the sheet (printed product) conveyed from the printer 4 with UV curing light. Accordingly, the ink that has landed onto the sheet is cured, thus the ink on the sheet is fixed on the sheet.

The image reader 6 is constituted by, for example, an in-line sensor, to optically read the entire surface of a page of the printed product that has passed through the UV lamp 5. Then, the image reader 6 transmits the read image obtained by reading to the image receiver 12.

The defective product sheet ejector 7 is a tray to which a printed product determined as a defective product by the image determinator 13 is ejected. The quality product sheet ejector 8 is a tray to which a printed product determined as a quality product by the image determinator 13 is ejected. The sheet ejection point switcher 9 switches the sheet ejection point of the printed product to the defective product sheet ejector 7 or the quality product sheet ejector 8 under the control by the apparatus controller 14.

The conveyance point switcher 10 switches the conveyance point of the printed product conveyed by the sheet conveyer 3 to the sheet ejection point switcher 9 or the reverser 11 under the control by the apparatus controller 14.

The reverser 11 is formed of a cylindrical drum, and is arranged at a position where a part of its outer periphery comes in contact with a part of the outer peripheral portion of the sheet conveyer 3. Then, the reverser 11 receives the rotation power of the sheet conveyer 3, thereby rotating in the clockwise direction opposite to the counterclockwise direction which is the rotation direction of the sheet conveyer 3.

The reverser 11 is provided with claws (not illustrated) on its outer peripheral portion.

When double-sided printing is instructed in the print job transmitted from the printer controller (not illustrated), the reverser 11 rotates, under the control by the apparatus controller 14, in a state where the above-mentioned claws (not illustrated) grip the edge portion of the printed product conveyed by the sheet conveyer 3, thus the front and back of the printed product are reversed. Then, at the time when the gripped edge portion of the printed product reaches the position of the sheet conveyer 3 again, the reverser 11 releases the gripping state of the printed product, thereby delivering the printed product to the sheet conveyer 3.

When double-sided printing is not instructed in the print job, the reverser 11 rotates without gripping the edge portion of the printed product, following the rotation operation of the sheet conveyer 3. Thus, the printed product is conveyed on the outer peripheral portion of the sheet conveyer 3 without being caught into the direction of the reverser 11, that is, without the front and back of the printed product being reversed.

The image receiver 12 receives the read image transmitted from the image reader 6 to output the read image to the image determinator 13. The image determinator 13 analyzes the read image input from the image receiver 12, thereby inspecting the printed product. That is, the image determinator 13 determines whether or not the image of the printed product has a defect. The image defect of the printed product includes, for example, a streak and a stain due to ejection failure of the nozzles of the printer 4.

The image determinator 13 compares a reference image with the read image read by the image reader 6, thereby determining the presence or absence of the image defect of the printed product. The reference image is a read image of the printed product generated through reference job printing, which precedes printing based on the print job. The reference image is stored in a storage 110 (see FIG. 2) to be described below or the like. In the reference job printing, images are formed on both sides of the sheet. That is, the reference image includes a reference image for the front surface and a reference image for the back surface. Then, the image determinator 13 outputs the inspection result of the printed product to the apparatus controller 14.

The apparatus controller 14 (an example of a controller) controls the operation of each section included in the image forming apparatus 100. For example, the apparatus controller 14 outputs, to the printing controller 15, a printing instruction based on the print job transmitted from the printer controller (not illustrated).

In addition, the apparatus controller 14 performs control, based on the inspection result by the image determinator 13, to switch the sheet ejection point of each printed product determined as a quality product or a defective product. For example, when the printed product is determined as a quality product by the image determinator 13, the apparatus controller 14 switches the conveyance point of the sheet by the conveyance point switcher 10 to the sheet ejection point switcher 9, and switches the sheet ejection point by the sheet ejection point switcher 9 to the quality product sheet ejector 8. On the other hand, when the printed product is determined as a defective product by the image determinator 13, the apparatus controller 14 switches the conveyance point of the sheet by the conveyance point switcher 10 to the sheet ejection point switcher 9, and switches the sheet ejection point by the sheet ejection point switcher 9 to the defective product sheet ejector 7.

In addition, when double-sided printing is instructed in the print job, the apparatus controller 14 controls the reverser 11 to reverse the front and back of the printed product. Further, the apparatus controller 14 performs control to cause the printed product being inspected to rotate on the outer peripheral portion of the sheet conveyer 3 without ejecting the printed product being inspected to the defective product sheet ejector 7 or the quality product sheet ejector 8 during start to end of the inspection processing of the printed product by the image determinator 13. Then, upon completion of the inspection of the target printed product, the apparatus controller 14 performs control to eject the printed product to the defective product sheet ejector 7 or the quality product sheet ejector 8.

The printing controller 15 causes the printer 4 to perform printing based on the print job transmitted from the printer controller (not illustrated) under the control by the apparatus controller 14.

<Configuration of Control System of Image Forming Apparatus>

Figure 2:
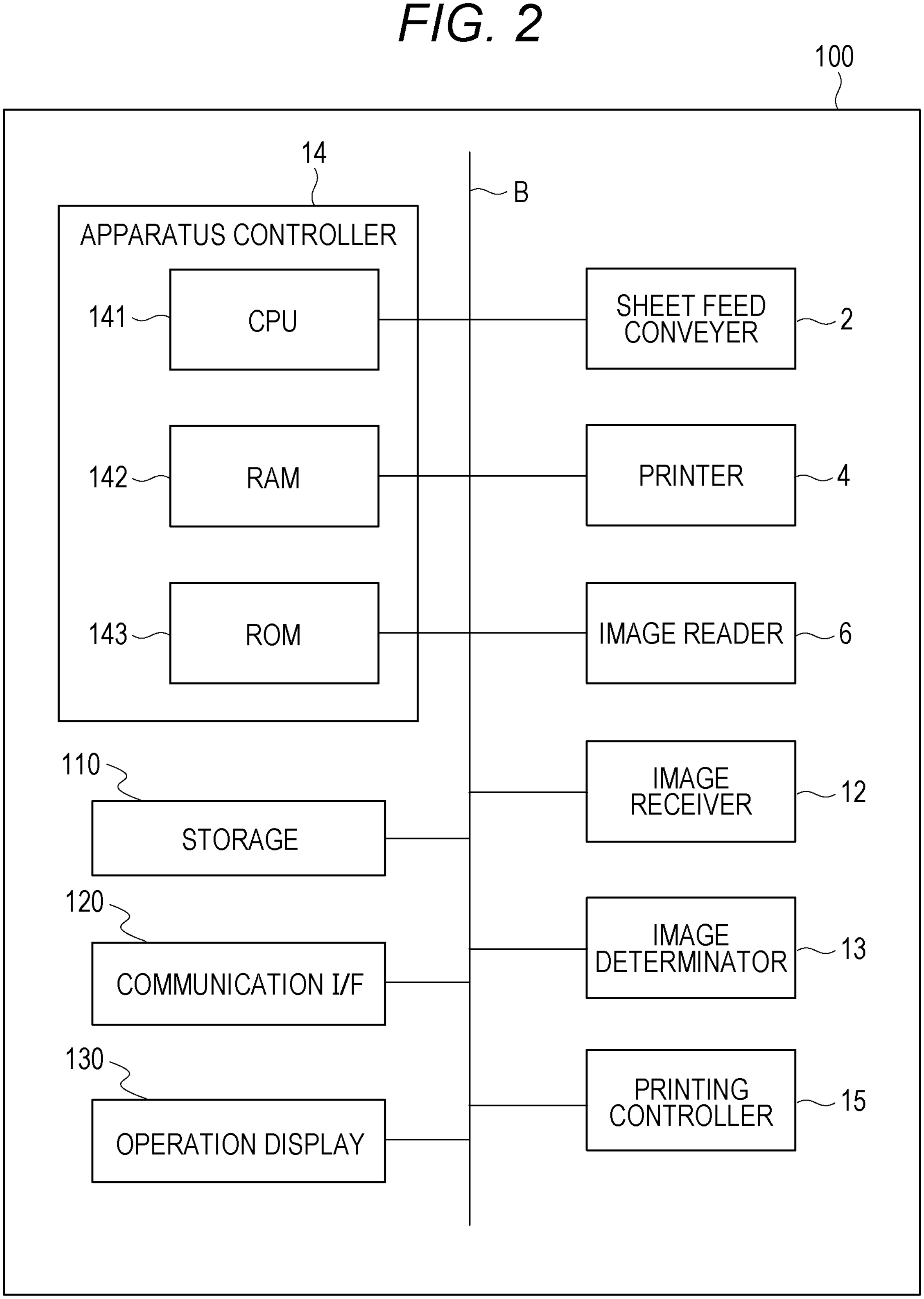
FIG. 2 is a block diagram illustrating a configuration example of a control system of the image forming apparatus according to the embodiment of the present invention.

Next, a configuration of a control system of the image forming apparatus 100 will be described with reference to FIG. 2. FIG. 2 is a block diagram illustrating a configuration example of the control system of the image forming apparatus 100.

As illustrated in FIG. 2, the image forming apparatus 100 includes the apparatus controller 14, the storage 110, a communication interface (I/F) 120, an operation display 130, the sheet feed conveyer 2, the printer 4, the image reader 6, the image receiver 12, the image determinator 13, and the printing controller 15.

The apparatus controller 14 includes, for example, a central processing unit (CPU) 141, a random access memory (RAM) 142, and a read only memory (ROM) 143. The RAM 142 is used as a work area for the CPU 141. The ROM 143 stores therein a program executed by the CPU 141 and the like.

The CPU 141 of the apparatus controller 14 is connected to each section included in the image forming apparatus 100 via a system bus B to control the operation of each section included in the image forming apparatus 100.

The storage 110 is a large-capacity storage device constituted by a hard disc drive (HDD), a solid state drive (SSD), or the like. The storage 110 stores therein image data included in the print job input from the printer controller (not illustrated), data on the ejection amount of ink droplets from a nozzle group (not illustrated) of the printer 4, and the like.

The communication I/F 120 is connected to the printer controller (not illustrated) to supply the image data received from the printer controller to the apparatus controller 14 via the system bus B.

The operation display 130 includes, for example, a touch screen in which a panel type display and an operation input section such as a touch sensor are integrally formed, and the like. Examples of the panel type display include a liquid crystal display (LCD) and an organic electro luminescence (EL) display device. The operation display 130 generates an operation signal indicating contents of an operation from the user input to the operation input section to supply the operation signal to the apparatus controller 14. Note that the display and the operation input section may be configured as separate bodies.

Since the sheet feed conveyer 2, the printer 4, the image reader 6, the image receiver 12, the image determinator 13, and the printing controller 15 have been described with reference to FIG. 1, the description thereof will be omitted.

<Overview of Image Inspection Processing>

Figure 3:
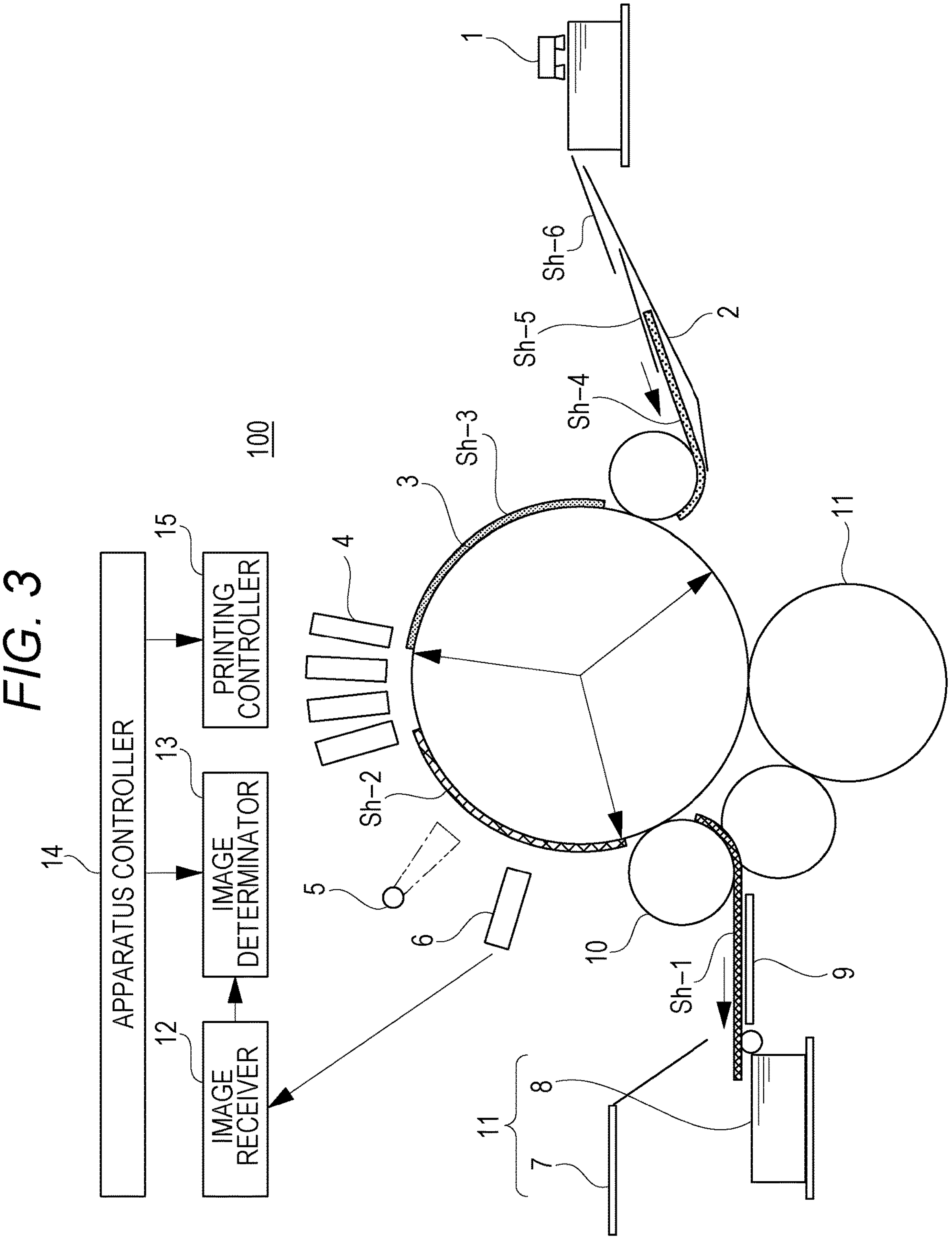
FIG. 3 is a diagram illustrating a sheet conveyance example in normal printing processing in which inspection is not performed by an image determinator according to the embodiment of the present invention.

Next, an overview of image inspection processing by the image forming apparatus 100 according to the present embodiment will be described with reference to FIGS. 3 to 9. FIG. 3 is a diagram illustrating a sheet conveyance example in normal printing processing in which inspection is not performed by the image determinator 13. FIGS. 4 to 9 are diagrams illustrating a sheet conveyance example in inspection processing by the image determinator 13.

First, the sheet conveyance example in the normal printing processing in which inspection is not performed by the image determinator 13 will be described with reference to FIG. 3. FIG. 3 illustrates a state in which six sheets Sh-1 to Sh-6 fed from the sheet feed device 1 are conveyed in the image forming apparatus 100. The sheet Sh-1 is the sheet fed from the sheet feed device 1 first in time and the sheet Sh-6 is the sheet fed from the sheet feed device 1 last in time.

The sheets fed from the sheet feed device 1 are first conveyed on the sheet feed conveyer 2 toward the sheet conveyer 3, as illustrated with the sheet Sh-4 to the sheet Sh-6. Then, as illustrated with the sheet Sh-3, the sheet carried by the sheet conveyer 3 is conveyed toward the printer 4. The sheet on which an image is formed by the printer 4, that is, the printed product, is irradiated with the UV curing light by the UV lamp 5, as illustrated with the sheet Sh-2. Thereafter, the image formed on the printed product is read by the image reader 6.

The printed product of which image has been read by the image reader 6 is conveyed toward the sheet ejection point switcher 9 by the conveyance point switcher 10, to be ejected to the quality product sheet ejector 8 positioned ahead of the sheet ejection point switcher 9, as illustrated with the sheet Sh-1.

Next, the sheet conveyance example in the inspection processing by the image determinator 13 will be described with reference to FIGS. 4 to 9. First, the description will be provided focusing on the sheet Sh-1 fed from the sheet feed device 1 first in time.

Figure 4:
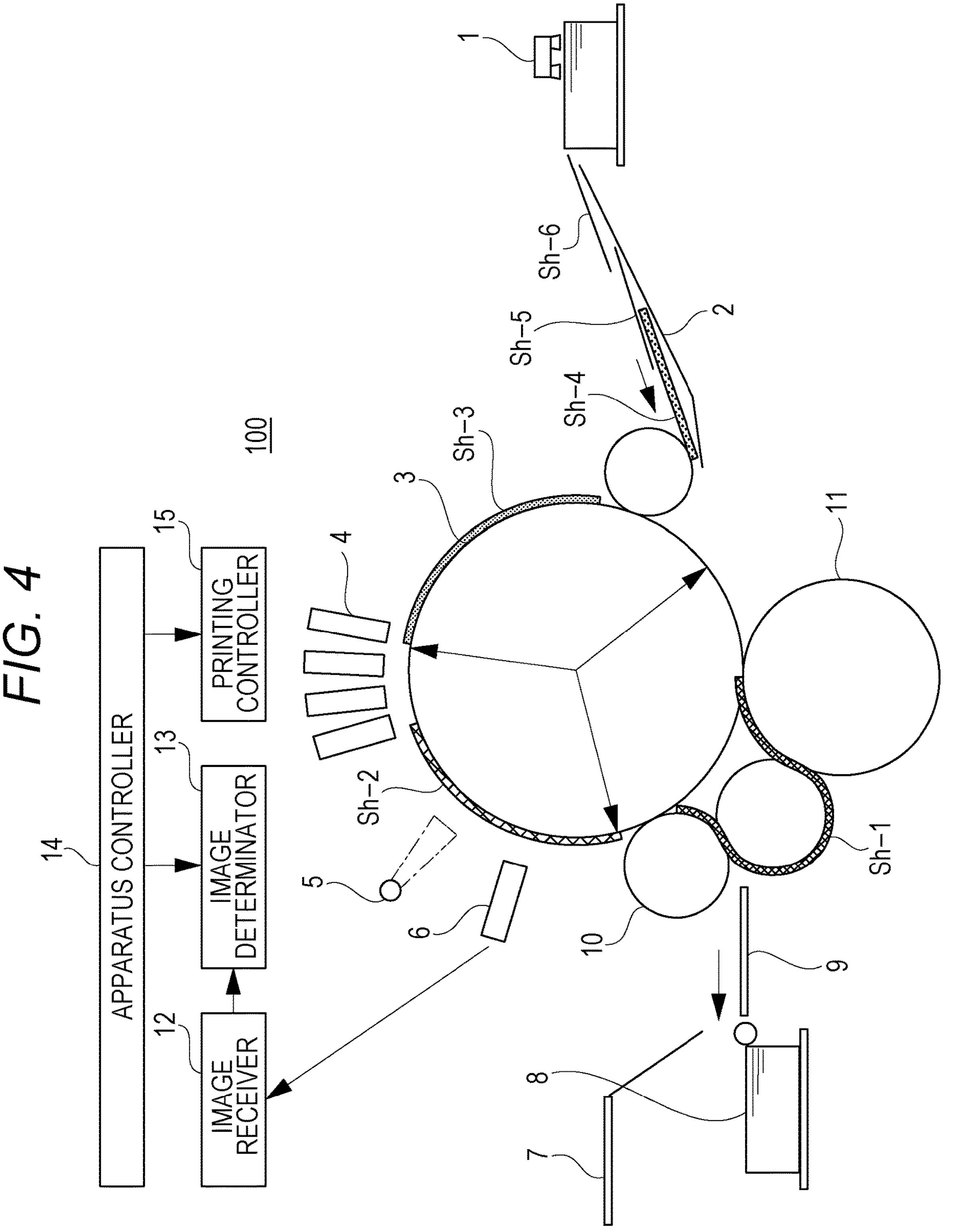
FIG. 4 is a diagram illustrating a sheet conveyance example in inspection processing by the image determinator according to the embodiment of the present invention.

As illustrated in FIG. 4, the sheet Sh-1, which is the printed product of which inspection has been started by the image determinator 13 after the image reading by the image reader 6, is not conveyed toward the sheet ejection point switcher 9 but is conveyed toward the reverser 11 in the present embodiment. That is, the sheet Sh-1 is caused to rotate on the outer peripheral portion of the sheet conveyer 3.

Figure 5:
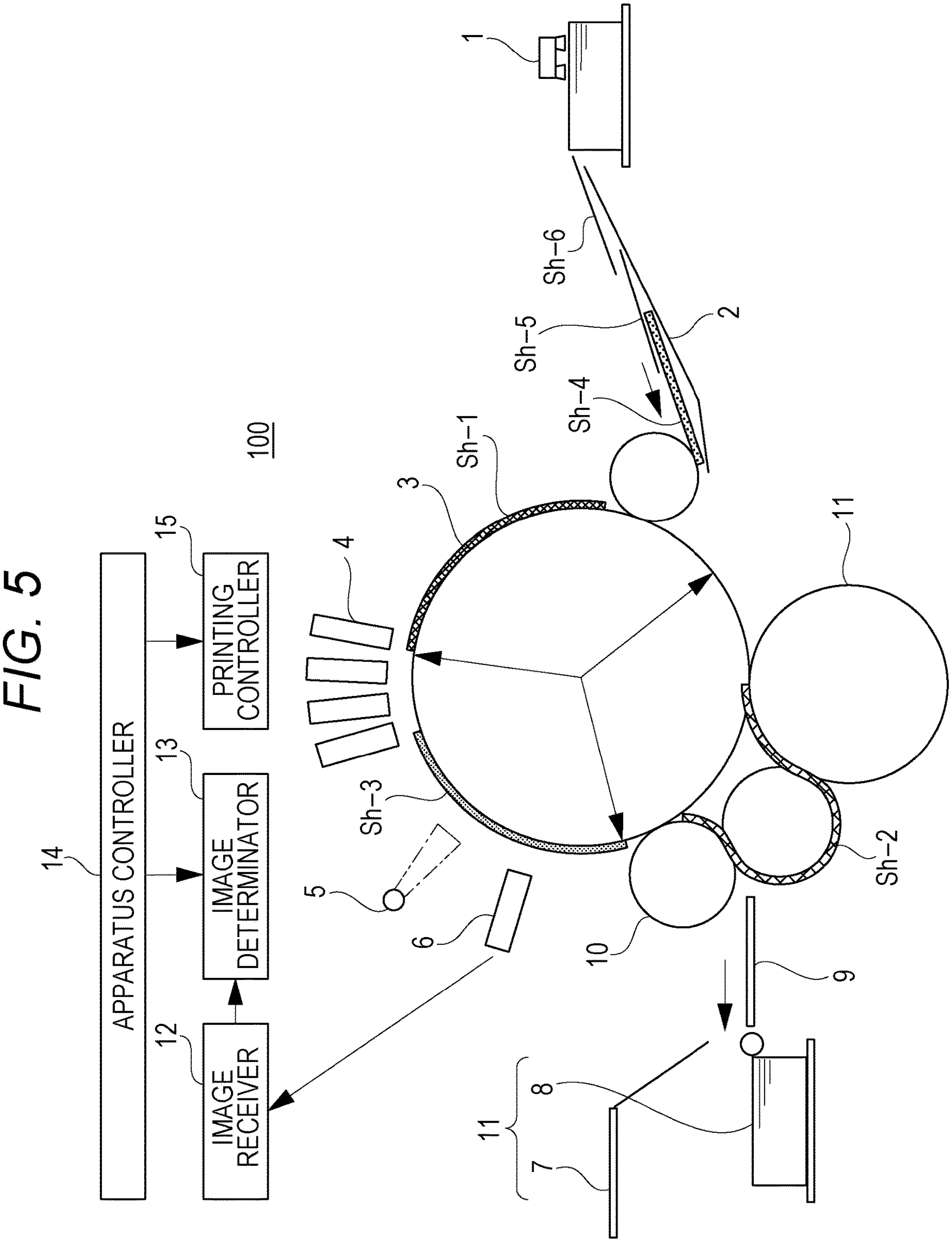
FIG. 5 is a diagram illustrating the sheet conveyance example in the inspection processing by the image determinator according to the embodiment of the present invention.
Figure 6:
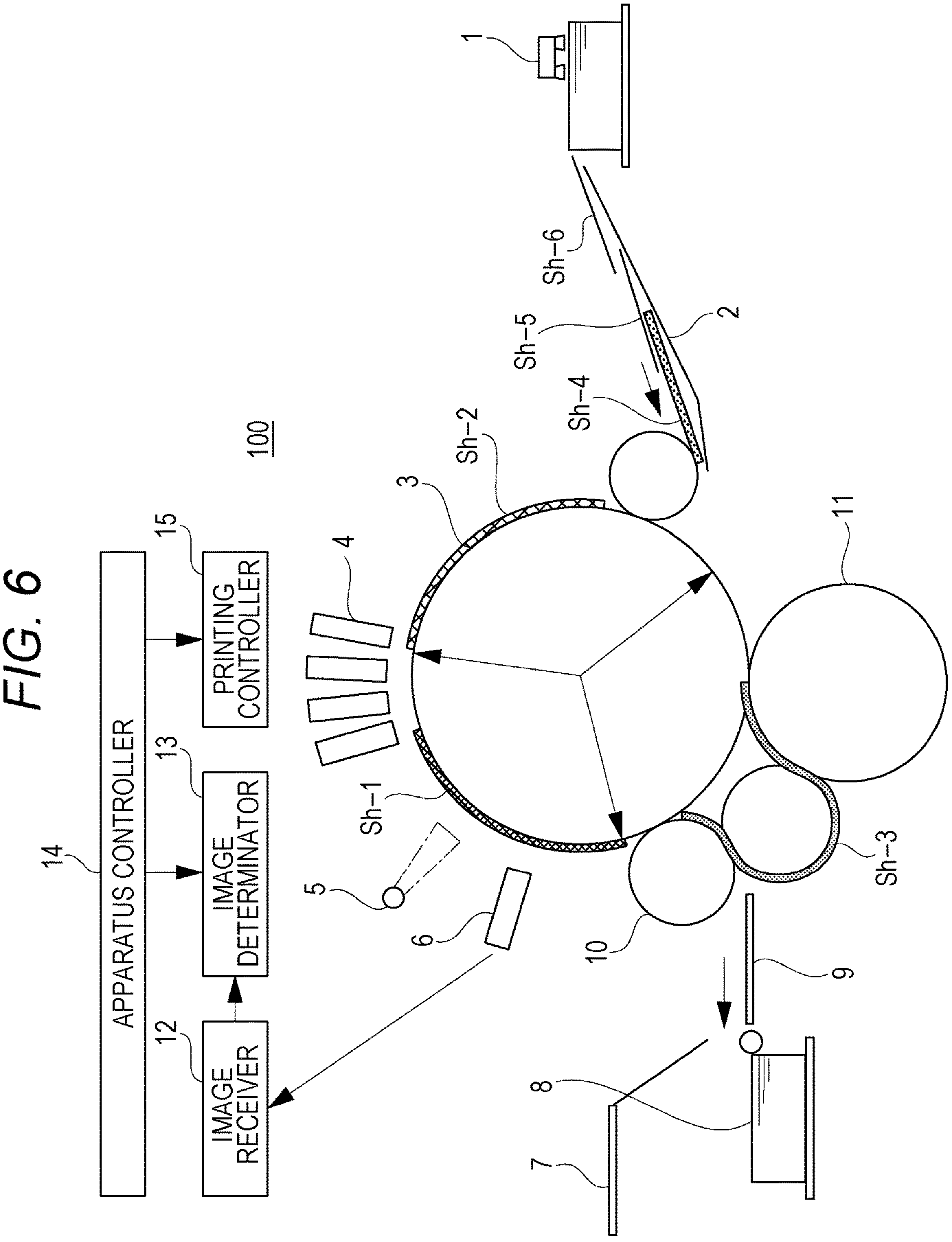
FIG. 6 is a diagram illustrating the sheet conveyance example in the inspection processing by the image determinator according to the embodiment of the present invention.

Then, the sheet Sh-1, which is the printed product of which inspection has been started, is again conveyed to the outer peripheral portion of the sheet conveyer 3 as illustrated in FIG. 5, and passes under the UV lamp 5 and the image reader 6 as illustrated in FIG. 6. The conveyance position of each sheet and the processing status of the sheet are managed in association with each other by the apparatus controller 14. Thus, for the sheet Sh-1, on which an image has already been formed and of which image reading by the image reader 6 has also been completed, the printer 4 does not perform image formation, the UV lamp 5 does not perform irradiation with the UV curing light, and the image reader 6 does not perform image reading.

Figure 7:
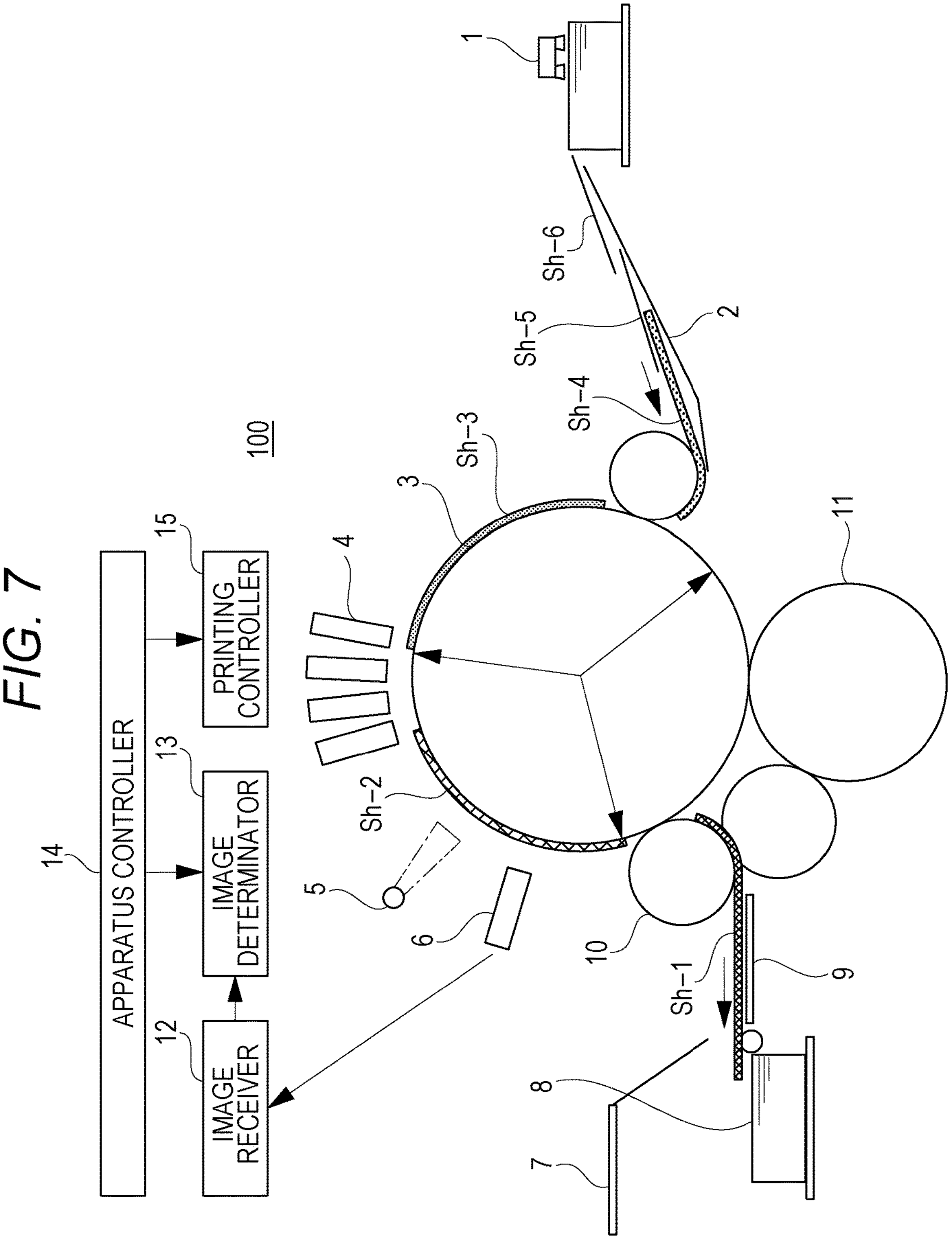
FIG. 7 is a diagram illustrating the sheet conveyance example in the inspection processing by the image determinator according to the embodiment of the present invention.

Thereafter, as illustrated in FIG. 7, in a case where the inspection by the image determinator 13 is completed at the time when the sheet Sh-1 reaches the position of the sheet ejection point switcher 9 again, the operation of the conveyance point switcher 10 is controlled by the apparatus controller 14 based on the result of its inspection. Specifically, the printed product is controlled to be conveyed towards the sheet ejection point switcher 9.

Then, in a case where the inspection result by the image determinator 13 indicates that the printed product is a quality product, the operation of the sheet ejection point switcher 9 is controlled under the control by the apparatus controller 14. Thus, the sheet Sh-1 is conveyed toward the quality product sheet ejector 8 to be ejected to the quality product sheet ejector 8.

The sheet Sh-2 fed from the sheet feed device 1 after the sheet Sh-1 is similarly controlled by the apparatus controller 14. That is, after the image reading by the image reader 6 is finished as illustrated in FIG. 4, the sheet Sh-2 is not conveyed toward the sheet ejection point switcher 9 but is conveyed toward the reverser 11 as illustrated in FIG. 5. That is, the sheet Sh-2 is caused to rotate on the outer peripheral portion of the sheet conveyer 3.

Figure 8:
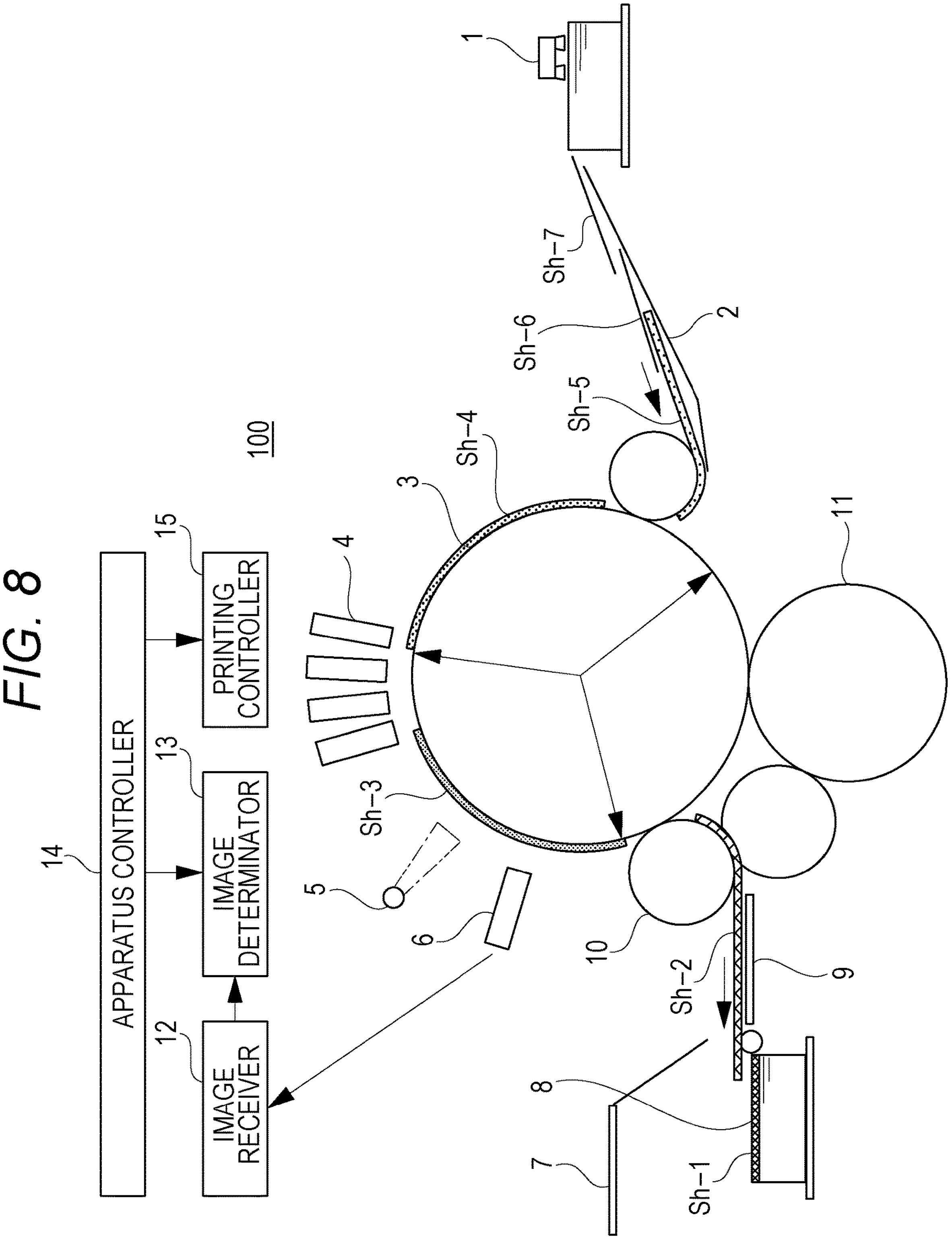
FIG. 8 is a diagram illustrating the sheet conveyance example in the inspection processing by the image determinator according to the embodiment of the present invention.

Then, the sheet Sh-2, which is the inspected printed product, is again conveyed to the outer peripheral portion of the sheet conveyer 3 as illustrated in FIG. 6, and passes under the UV lamp 5 and the image reader 6 as illustrated in FIG. 7. Thereafter, as illustrated in FIG. 8, in a case where the inspection by the image determinator 13 is completed at the time when the sheet Sh-2 reaches the position of the sheet ejection point switcher 9, the conveyance point of the sheet by the conveyance point switcher 10 is switched toward the sheet ejection point switcher 9 by the apparatus controller 14 based on the result of its inspection.

Then, in a case where the inspection result by the image determinator 13 indicates that the printed product is a quality product, the operation of the sheet ejection point switcher 9 is controlled under the control by the apparatus controller 14. Thus, the sheet Sh-2 is conveyed toward the quality product sheet ejector 8 to be ejected to the quality product sheet ejector 8.

Figure 9:
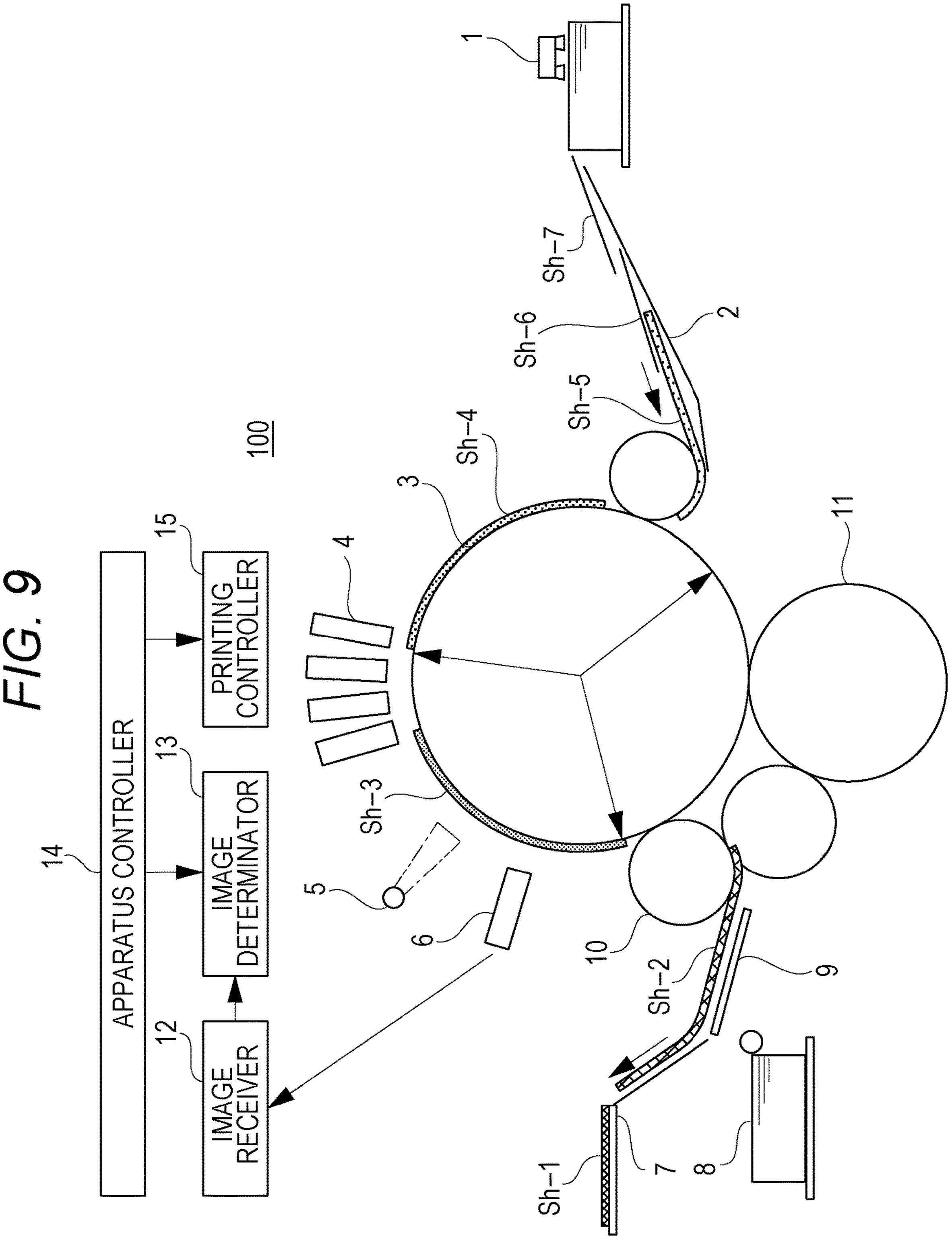
FIG. 9 is a diagram illustrating the sheet conveyance example in the inspection processing by the image determinator according to the embodiment of the present invention.

On the other hand, in a case where the sheet Sh-2 is determined as a defective product by the image determinator 13, as illustrated in FIG. 9, the sheet Sh-2 is ejected to the defective product sheet ejector 7.

According to the present embodiment, it is possible to prevent, in a case where the inspection processing is not completed, the printed product that has reached the position of the sheet ejection point switcher 9 from being ejected to the quality product sheet ejector 8 set as the specified sheet ejection point. Accordingly, it is possible to prevent a defective product that should originally be ejected to the defective product sheet ejector 7 from being mixed into the quality product sheet ejector 8.

In addition, in the present embodiment, the printed product being inspected by the image determinator 13 is caused to rotate on the outer periphery of the sheet conveyer 3. This configuration can gain the time until the end of the inspection, thereby preventing a defective printed product from being mixed into a quality printed product. Therefore, according to the present embodiment, it is unnecessary to newly provide a device for path extension, a buffer tray, or the like, which enables sorting a defective product without requiring time and effort of the user and without increasing or decreasing cost.

Note that in the present embodiment, in a case where the printed products based on the print job are printed products that needs to be printed in a predetermined order, for example, when the printed products are printed products to which page numbers are assigned or printed products to be bound, the apparatus controller 14 performs control as follows.

(1) To temporarily suspend a printing instruction to the printing controller 15 and also suspend feeding of a new sheet from the sheet feed device 1 after determination as a defective product by the image determinator 13.

(2) To eject, to the defective product sheet ejector 7, all of the sheets being conveyed on the outer peripheral portion of the sheet conveyer 3 at the time of the determination as a defective product by the image determinator 13, regardless of its inspection result by the image determinator 13.

(3) To resume reprinting of an image of the printed product determined as a defective product and printing of an image subsequent to the image of the printed product determined as a defective product after completion of the ejection, to the defective product sheet ejector 7, of all of the sheets being conveyed on the outer peripheral portion of the sheet conveyer 3.

By being controlled as described in (1) to (3) above, it is possible to prevent occurrence of missing in the order of printed products while preventing a defective product from being mixed into the quality product sheet ejector 8. Consequently, it becomes unnecessary for the user to insert the printed product on which the image of the printed product determined as a defective product is reprinted into the printed products determined as a quality product in the page order.

In addition, in the conventional technique, the operation of the image forming apparatus is completely stopped, awaiting the user to remove the defective product. On the other hand, in the present embodiment, it is only necessary to temporarily suspend printing. Consequently, a warm-up operation or the like is unnecessary at the restart of printing by the image forming apparatus 100. Thus, according to the present embodiment, a decrease in productivity can be minimized.

Note that in a case where it is unnecessary to consider the order of the printed products, for example, when the images on all of the printed products to be continuously printed are identical, the apparatus controller 14 may perform control to eject, to the defective product sheet ejector 7, only the printed product determined as a defective product.

<Procedure of Image Inspection Processing>

Figure 10:
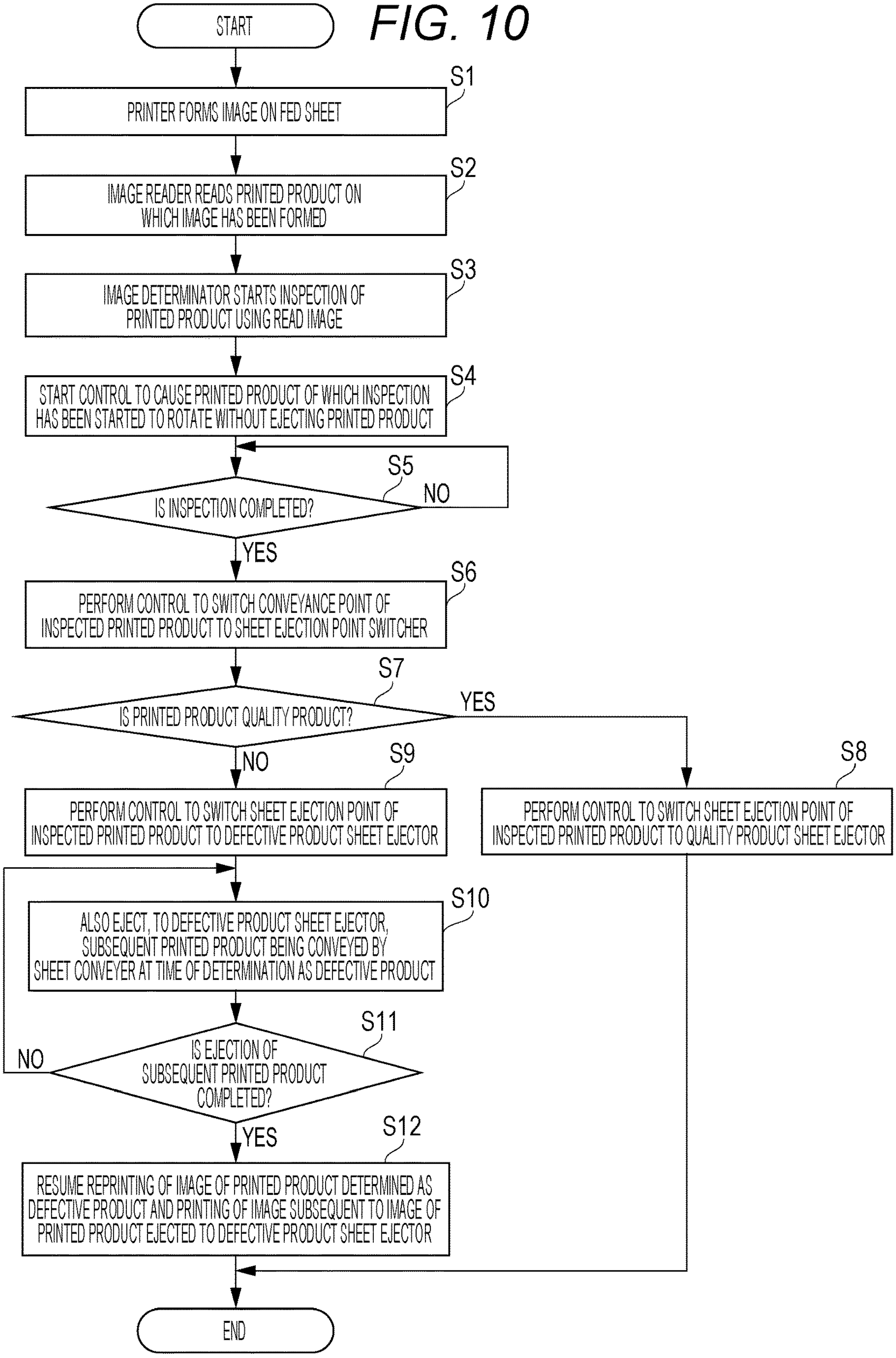
FIG. 10 is a flowchart illustrating a procedure example of image inspection processing by the image forming apparatus according to the embodiment of the present invention.

Next, procedure of the image inspection processing by the image forming apparatus 100 according to the present embodiment will be described with reference to FIG. 10. FIG. 10 is a flowchart illustrating a procedure example of the image inspection processing by the image forming apparatus 100. FIG. 10 illustrates the procedure example of the image inspection processing in a case of printing of the printed products of which order is necessary to be considered.

First, the printer 4 forms an image on the sheet fed from the sheet feed device 1 (see FIG. 1) (step S1). Next, the image reader 6 reads the printed product which is the sheet on which the image has been formed by the printer 4 (step S2). Next, the image determinator 13 starts the inspection of the printed product using the read image received from the image reader 6 via the image receiver 12 (step S3). Next, the apparatus controller 14 starts control to cause the printed product of which inspection has been started to rotate on the outer peripheral portion of the sheet conveyer 3 without ejecting the printed product (step S4).

Next, the apparatus controller 14 determines whether or not the inspection of the printed product, which has been started in step S3, is completed (step S5). In a case where it is determined in step S5 that the inspection has not been completed (NO in step S5), the apparatus controller 14 repeats the determination of step S5. During this time, the printed product being inspected continues to rotate on the outer periphery of the sheet conveyer 3.

On the other hand, in a case where it is determined in step S5 that the inspection has been completed (YES in step S5), the apparatus controller 14 controls the conveyance point switcher 10 to switch the conveyance point of the inspected printed product to the sheet ejection point switcher 9 (step S6).

Note that when double-sided printing is instructed in the print job, the apparatus controller 14 again causes the printed product of which front surface has been inspected to rotate, conveying the printed product toward the reverser 11 to cause the reverser 11 to reverse the front and back of the printed product. Thereafter, the apparatus controller 14 performs control similarly to the control for the front surface of the printed product.

That is, the apparatus controller 14 causes the printer 4 to perform image formation onto the back surface of the printed product, the UV lamp 5 to perform irradiation with the UV curing light, the image reader 6 to perform image reading of the printed product, and the image determinator 13 to perform inspection. Then, upon completion of the inspection, the apparatus controller 14 controls the conveyance point switcher 10 to switch the conveyance point of the inspection target printed product to the sheet ejection point switcher 9.

Note that in a case where the printed product is determined as a defective product through the inspection of its front surface by image determinator 13, the apparatus controller 14 performs control, even when the double-sided printing is instructed in the print job, to eject the printed product to the defective product sheet ejector 7 without forming an image on the back surface of the printed product. By such control, it is possible to prevent unnecessary printing on the back surface of the printed product determined as a defective product.

After step S6, the apparatus controller 14 determines whether or not the printed product is determined as a quality product by the image determinator 13, that is, whether or not the printed product is a quality product (step S7). In a case where it is determined in step S7 the printed product is a quality product (YES in step S7), the apparatus controller 14 controls the sheet ejection point switcher 9 to switch the sheet ejection point of the inspected printed product to the quality product sheet ejector 8 (step S8).

On the other hand, in a case where it is determined in step S7 the printed product is not a quality product, that is, a defective product (NO in step S7), the apparatus controller 14 controls the sheet ejection point switcher 9 to switch the sheet ejection point of the inspected printed product to the defective product sheet ejector 7 (step S9).

Next, the apparatus controller 14 performs control to also eject, to the defective product sheet ejector 7, the subsequent printed product being conveyed by the sheet conveyer 3 at the time of the determination as a defective product by the image determinator 13 (step S10).

Next, the apparatus controller 14 determines whether or not the ejection of the subsequent printed product to the defective product sheet ejector 7 has been completed (step S11).

In a case where it is determined in step S11 that the ejection has not been completed (NO in step S11), the apparatus controller 14 repeats the ejection of step S10 and the determination of step S11. On the other hand, in a case where it is determined in step S11 that the ejection has been completed (YES in step S11), the apparatus controller 14 performs control to resume reprinting of an image of the printed product determined as a defective product and printing of an image subsequent to the image of the printed product ejected to the defective product sheet ejector 7 (step S12). After the processing of step 12, the image inspection processing by the image forming apparatus 100 ends.

Note that the present invention is not limited to the above-described embodiment, and it is needless to say that other various application examples and modification example can be adopted without departing from the scope of the present invention described in the claims.

For example, in the above-described embodiment, the configuration of the apparatus has been described in detail and specifically for easy understanding of the present invention, and the present invention is not necessarily limited to an apparatus including all of the configuration described herein.

In addition, control lines, information lines and the like indicated by solid lines or arrows in FIG. 1 and FIG. 2 that are considered to be necessary for description are indicated, and all of the control lines and information lines in a product are not necessarily indicated.

In practice, it may be considered that almost all of the configurations are connected to each other.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:

a sheet conveyer having a cylindrical shape that conveys a sheet;

an image former that forms an image on the sheet conveyed by the sheet conveyer;

an image reader that generates a read image of a printed product which is the sheet on which the image has been formed by the image former;

a conveyance point switcher configured to switch a conveyance point of the printed product conveyed by the sheet conveyer; and a hardware processor, wherein the hardware processor inspects for presence or absence of a defect in the printed product based on the read image, the hardware processor causes the printed product being inspected to rotate again on an outer peripheral portion of the sheet conveyer by conveying the printed product via the conveyance point switcher without ejecting the printed product being inspected from the apparatus during start to end of inspection of the printed product, and upon completion of the inspection, the hardware processor causes the conveyance point switcher to switch the conveyance point to eject the printed product from the apparatus.

2. The image forming apparatus according to claim 1, wherein the hardware processor performs control to eject the printed product determined as a quality product to a quality product sheet ejector and to eject the printed product determined as a defective product to a defective product sheet ejector.

3. The image forming apparatus according to claim 2, wherein in a case where the printed product determined as a defective product is a printed product that needs to be printed in a predetermined order, the hardware processor performs control to eject, to the defective product sheet ejector, a printed product rotating on the outer peripheral portion of the sheet conveyer at a time when the printed product is determined as a defective product.

4. The image forming apparatus according to claim 3, wherein after completion of ejection, to the defective product sheet ejector, of the printed product rotating on the outer peripheral portion of the sheet conveyer at the time when the printed product is determined as a defective product, the hardware processor performs control to resume reprinting of an image of the printed product determined as a defective product and printing of an image subsequent to the image of the printed product determined as a defective product.

5. The image forming apparatus according to claim 2, further comprising:

a reverser that reverses a front and back of the sheet conveyed by the sheet conveyer, wherein when double-sided printing is instructed for a printed product determined as a quality product, the hardware processor conveys the printed product to the reverser to reverse the front and back and causes the image former to form an image.

6. The image forming apparatus according to claim 5, wherein when double-sided printing is instructed for a printed product determined as a quality product and the printed product is the printed product determined as a defective product, the hardware processor performs control to eject the printed product to the defective product sheet ejector without conveying the printed product to the reverser.

7. An image inspection method comprising:

conveying a sheet by a sheet conveyer having a cylindrical shape;

forming an image on the sheet conveyed by the sheet conveyer;

generating a read image of a printed product which is the sheet on which the image has been formed;

inspecting for presence or absence of a defect in the printed product based on the read image;

causing the printed product being inspected to rotate again on an outer peripheral portion of the sheet conveyer by conveying the printed product via a conveyance point switcher, which is configured to switch a conveyance point of the printed product conveyed by the sheet conveyer, without ejecting the printed product being inspected from an apparatus during start to end of inspection of the printed product; and upon completion of the inspection, switching the conveyance point of the conveyance point switcher to eject the printed product from the apparatus.

8. The image forming apparatus according to claim 1, further comprising a reverser arranged adjacent to the sheet conveyer, wherein the conveyance point switcher is configured to switch the conveyance point of the printed product being inspected toward the reverser during start to end of inspection of the printed product.

9. The image forming apparatus according to claim 1, wherein, while the printed product being inspected rotates on the outer peripheral portion of the sheet conveyer, the image former does not perform image formation and the image reader does not perform image reading on the printed product being inspected.

* * * * *